US007146427B2

(12) United States Patent
Delaney et al.

(10) Patent No.: US 7,146,427 B2
(45) Date of Patent: Dec. 5, 2006

(54) POLLING-BASED MECHANISM FOR IMPROVED RPC TIMEOUT HANDLING

(75) Inventors: William P. Delaney, Wichita, KS (US); Kevin W. Copas, Andover, KS (US); Ray M. Jantz, Wichita, KS (US); Carey W. Lewis, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 836 days.

(21) Appl. No.: 10/128,442

(22) Filed: Apr. 23, 2002

(65) Prior Publication Data

US 2003/0200329 A1 Oct. 23, 2003

(51) Int. Cl.
*G06F 15/16* (2006.01)
(52) U.S. Cl. .................. 709/237; 709/227; 370/450; 370/451; 370/463
(58) Field of Classification Search ........ 709/230–237, 709/248; 710/220; 725/16; 370/449–463
See application file for complete search history.

(56) References Cited

U.S. PATENT DOCUMENTS

| 5,812,749 | A * | 9/1998 | Fernandez et al. ............. 714/4 |
| 6,496,511 | B1 * | 12/2002 | Wang et al. ................ 370/401 |
| 6,775,704 | B1 * | 8/2004 | Watson et al. .............. 709/229 |
| 6,799,214 | B1 * | 9/2004 | Li .............................. 709/226 |
| 2002/0080948 | A1 * | 6/2002 | Canali et al. ............... 379/229 |
| 2002/0116515 | A1 * | 8/2002 | Hashimoto ................. 709/230 |
| 2002/0143946 | A1 * | 10/2002 | Crosson ..................... 709/226 |
| 2003/0126282 | A1 * | 7/2003 | Sarkar et al. ............... 709/237 |

* cited by examiner

*Primary Examiner*—Krisna Lim
(74) *Attorney, Agent, or Firm*—Yee & Associates

(57) ABSTRACT

The present invention provides for a method and computer program product for handling timeout in a standard RPC connection. First, a client establishes a connection with a server with unique identification. After submitting an RPC request, the client system will periodically make secondary requests to the server to determine if the server is still actively processing the primary RPC request. If the secondary request is processed successfully and the server indicates that the primary request is still in progress, the client will continue to wait until either the primary request completes or enough time elapses to warrant another secondary request. The success of the secondary request hinges on finding a match of identification for the primary and secondary requests. If the secondary request fails, this failure is treated as a sign that there is either a network or a server problem, and the client is triggered into taking appropriate corrective action. To provide for a reasonably graceful failure mechanism, this polling protocol can be modified to require a predetermined number of successive secondary poll failures before signaling a failure of the primary RPC request.

10 Claims, 2 Drawing Sheets

POLLING-BASED MECHANISM FOR IMPROVED RPC TIMEOUT HANDLING

BACKGROUND OF THE INVENTION

1. Technical Field

The present invention is directed generally toward a method and computer instruction for timeout handling. Specifically it is a polling based mechanism for handing timeouts in a standard RPC connection.

2. Description of the Related Art

A procedure is a software routine that runs in a computer. A procedure call is a request by one procedure to another procedure for some service. This is relatively simple when both procedures are running in the same computer. A remote procedure call ("RPC") is a request made by a process in one computer to another computer across a network. RPCs tend to operate in real time because the calling program usually waits until it receives a response from the called program. RPCs are required in applications in which a procedure should not continue until it receives the information it needs from the remote system. RPC protocol limits a given connection to allow at most one pending RPC interaction at a time, but may have concurring requests.

Sun Microsystems popularized the technique with its SunsSoft's Open Network Computing (ONC) remote procedure calls. According to ONC RPC, the client establishes a simple "maximum wait time" value when waiting for the reply message associated with an RPC request to a server system. If the reply does not arrive within the allotted time, the underlying RPC implementation will indicate that a failure occurred, and the client will be forced to take application-specific corrective action. This approach has been applied in which the RPC requests submitted by a client can be handled quickly (e.g. on the order of several seconds or less) by the server system. In such cases, a reasonable timeout value, such as 30 seconds, provides ample time for the reply message to traverse the network between the server and the client. If a reply does not arrive within this time window, it is fairly safe for the client to assume that a network problem exists, or that the server system has crashed. In either case, it is appropriate for the client to take some form of corrective action, which might include terminating the client application, or at least informing the end-user that an operation failed due to a server or network problem.

The approach does not work nearly so well in cases where the requested operation may require lengthy processing by the sever system. An example of such a situation is when the RPC server is managing physical devices at the request of the RPC client. Therefore, it would be advantageous to have an improved method for polling RPCs.

SUMMARY OF THE INVENTION

The present invention provides for a polling based mechanism for handling timeout in a standard RPC connection. After submitting an RPC request, the client system will periodically make secondary requests to the server to determine if the server is still actively processing the primary RPC request. If the secondary request is processed successfully and the server indicates that the primary request is still in progress, the client will continue to wait until either the primary request completes or enough time elapses to warrant another secondary request. If the secondary request fails, this failure is treated as a sign that there is either a network or a server problem, and the client is triggered into taking appropriate corrective action. To provide for a reasonably graceful failure mechanism, this polling protocol can be modified to require a predetermined number of successive secondary poll failures before signaling a failure of the primary RPC request.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
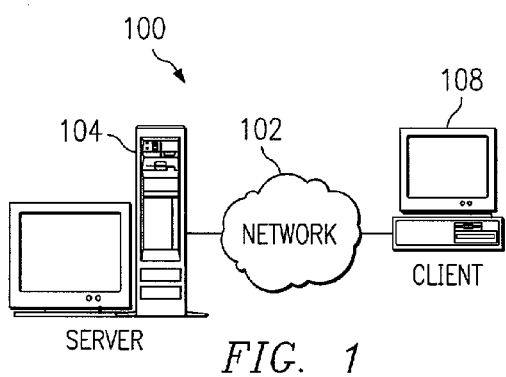
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted. Network system 100 is a network of computers in which the present invention may be implemented. Network system 100 contains network 102, which is the medium used to provide communication links between various devices and computers connected together within network system 100. Network 102 may include permanent connections, such as wire or fiber optic cables, or temporary connections made through telephone connections.

In the depicted example, server 104 is connected to network 102 to which client 108 is also connected. Client 108 may, for example, be a personal computer or network computer. For purposes of this application, a network computer is any computer, coupled to a network, which exchange data with another computer coupled to the network. In the depicted example, server 104 provides data, such as boot files, operating system images, and applications to client 108. Client 108 is a client to server 104. Network system 100 may include additional servers, clients, and other devices not shown. In the depicted example, network system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, network system 100 also may be implemented as a number of different types of networks, such as, for example, an Intranet or a local area network.

FIG. 1 is intended as an example, and not as an architectural limitation for the processes of the present invention. The present invention may be implemented in the depicted network system or modifications thereof as will be readily apparent to those of ordinary skill in the art.

Figure 2:
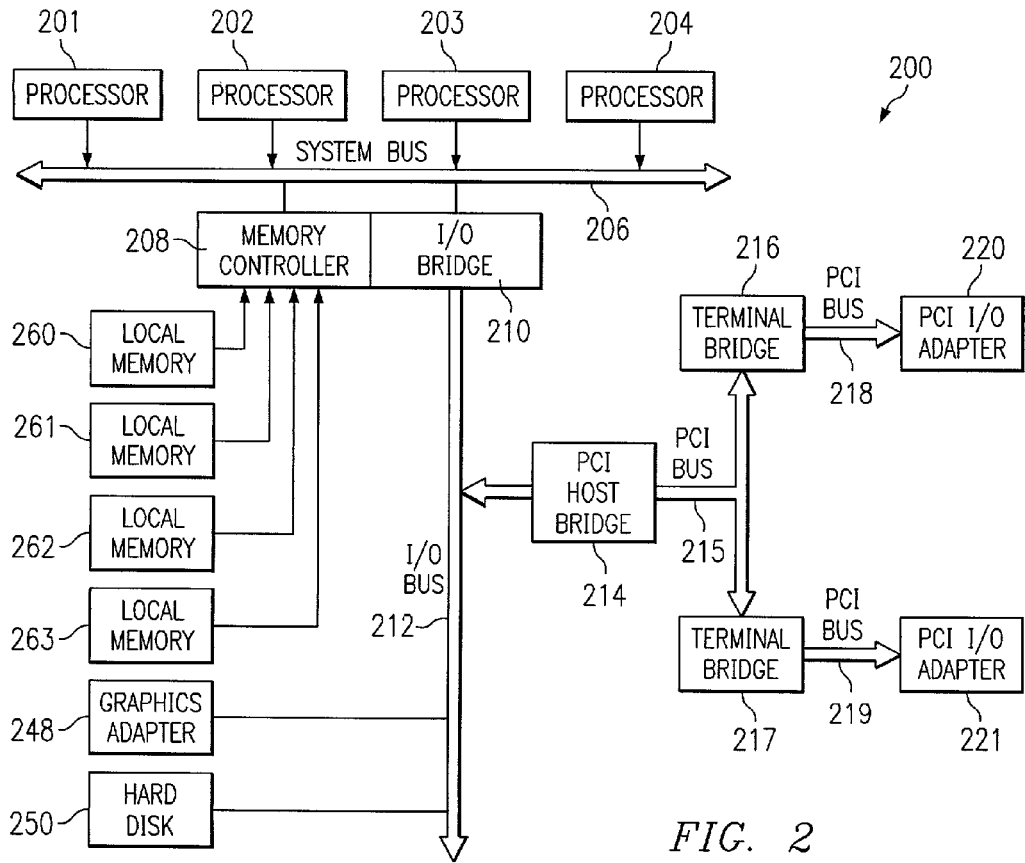
FIG. 2 depicts a block diagram of computer system in which the present invention may Feds be implemented.

FIG. 2 depicts a block diagram of a computer system according to an embodiment of the present invention. In this example, client 108 and sever 104 may be represented as a computer system. In this example, computer system 200 may be a symmetric multiprocessor ("SMP") system including a plurality of processors 201, 202, 203, and 204 connected to system bus 206. Alternatively, a single processor system may be employed. Also connected to system bus 106 is a memory controller, 208 which provides an interface to a plurality of local memories 260–263. I/O bus bridge 210 is connected to system bus 206 and provides an interface to I/O bus 212. Memory controller 208 and I/O bus bridge 210 may be integrated as depicted.

Peripheral component interconnect (PCI) Host bridge 214 connected to I/O bus 212 provides an interface to PCI bus 215. A number of terminal bridges 216–217 may be connected to PCI bus 215. Typical PCI bus implementations will support four terminal bridges for providing expansion slots or add-in connectors. Each of terminal bridges 216–217 is connected to a PCI I/O adapter 220–221 through PCI Bus 218–219. Each I/O adapter 220–221 provides an interface between computer system 200 and input/output devices such as, for example, other network computers, which are clients to server 200.

Alternatively, additional PCI host bridges may provide interfaces for additional PCI buses. Thus, additional I/O devices, such as modems or network adapters may be supported through each of the additional PCI buses. In this manner, server 200 allows connections to multiple network computers.

A memory mapped graphics adapter 248 and hard disk 250 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
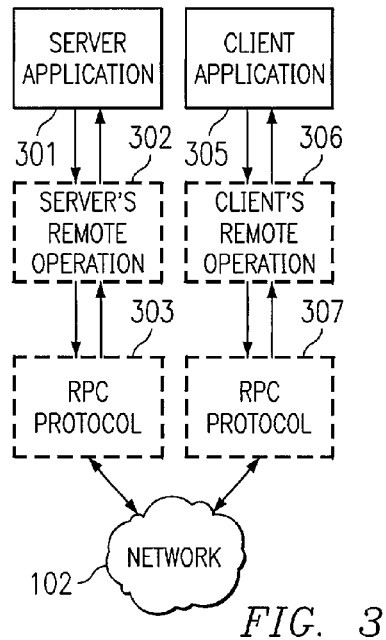
FIG. 3 illustrates a client and server application using Remote Procedure Call where the client makes a request to a server to run some procedure in accordance with a preferred embodiment of the present invention.

FIG. 3 shows block design of applications of client 108 and server 104. Server 104 includes server application 301, server remote operation 302, and server's RPC protocol 303. Client 108 includes client application 305, client remote operation 306, and client's RPC protocol 307. FIG. 3 illustrates client and server applications using Remote Procedure Call ("RPC") when client 108 makes a request to server 104 to run a procedure. Client 108 runs Client application 305 that presents the data to the user and interacts with the user. Server 104 runs its server application 301 with its data. Server remote operation 302 allows the procedure call to operate remotely. It receives remote requests and polling from client 108. It also sends replies over the network. Client remote operation 306 translates a call into remote requests and sends it over the network. It also receives remote responses and makes them appear to applications as if they were local responses. The RPC protocols 303 and 307 can be viewed as the components that integrate the transactions between server 104 and client 108 respectively over the network. RPCs provide a way for client 108 and server 104 to exchange information or connect with one another even though they have different interfaces or must interface over the network.

Figure 4:
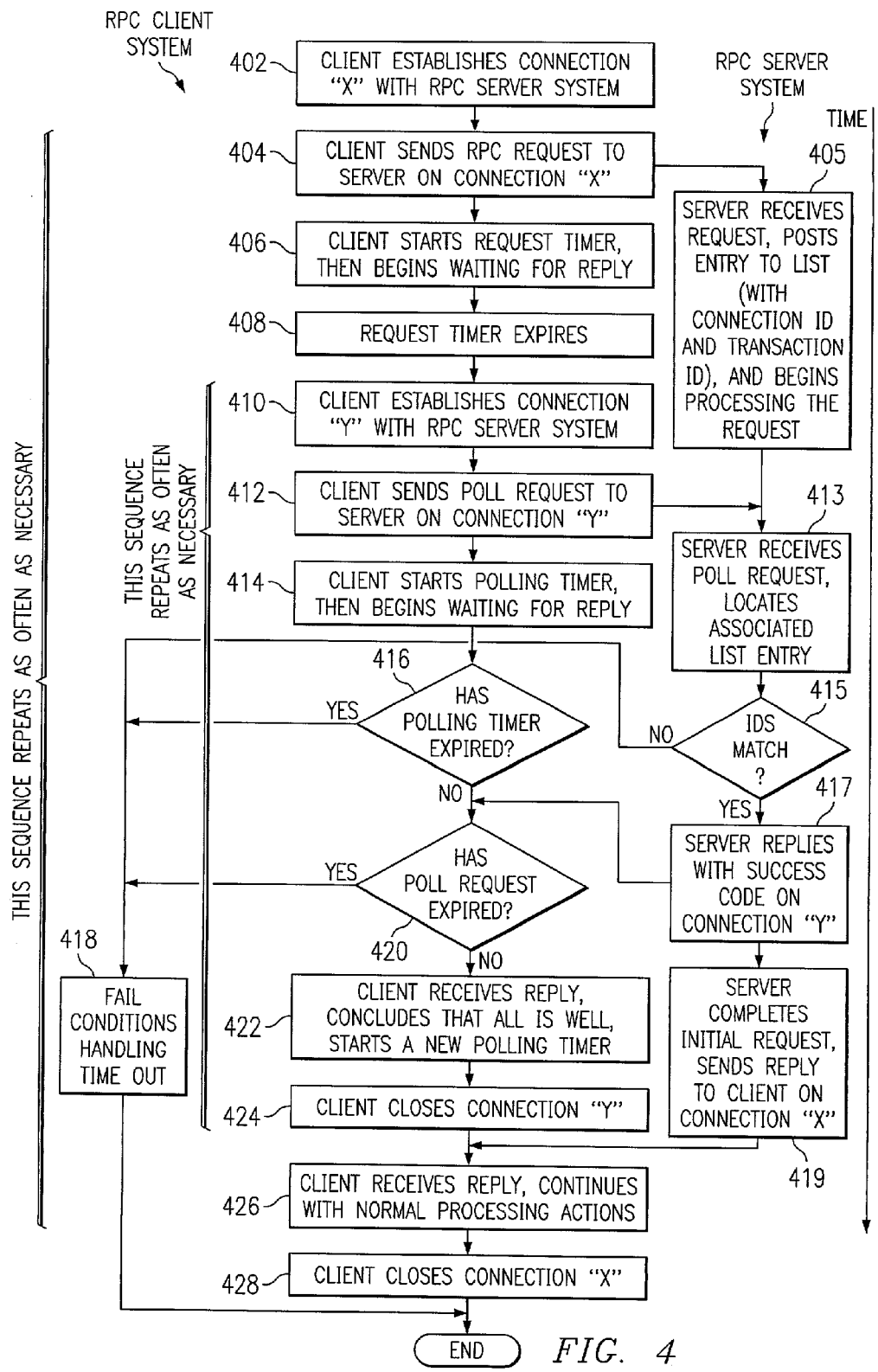
FIG. 4 depicts a flow chart of the polling mechanism for determining a timeout condition in accordance with a preferred embodiment of the present invention.

FIG. 4 depicts a flow chart of the polling mechanism for determining a timeout condition of the present invention.

The present invention focuses on client 108 use of a polling mechanism to query the status of an active RPC request that is presumed to be in progress on the server. First, client 108 establishes a primary connection with RPC Server (Step 402). With the RPC protocol, a connection between a client and a server is uniquely identified via an identifier of the connection including the Internet Protocol ("IP") addresses of client 108 and server 104 and TCP port numbers of client 108 and server 104. The connection may include multiple transactions of requests. Each transaction is identified by a transaction identification number ("transaction ID"). The transaction ID is 32 bit and identifies a unique transaction between client 108 and server 104. It is managed by client 108 to ensure uniqueness over the lifetime of a given TCP connection to server 104.

In an embodiment of the present invention, an application request is initiated pursuant to the standard ONC RPC (Step 404). Client 108 assigns a transaction ID. The transaction ID and connection identifiers are included in the header of the request message that is sent to server 104. Therefore, each request could be individually identified by a connection identifier and a transaction ID. The header also includes the type of function for the request.

When server 104 receives a request, it will first read the header. If the header indicates that the request is not a polling request, server 104 will post an entry to an internal tracking list to record the fact that the request is being processed (Step 450). The entry will contain the identifier of the connection and the transaction ID of the request.

After sending the application request, the client waits for a "reasonable" period of time of about 30 seconds (Step 406). This value may be varied and be made configurable to account for environmental differences in applications, networks, etc. If this time interval elapses (Step 408), Ago and no reply has been received from server 104, client 108 will submit a polling request instead of falling into a timeout for recovery action.

In preparation for submitting the polling request, client 108 establishes a new secondary TCP connection to server 104 (Step 410). Client 108 sends the polling request on the secondary connection to server 104. The polling request includes a message body with the connection identifier that uniquely identifies the primary (original) request's TCP connection, along with the transaction ID that uniquely identifies the original request message. The polling request's message body contains a function code value to indicate that it is a polling request.

Upon receiving the polling request (Step 452), server 104 reads the header indicating a polling request. Server 104 will then attempt to find an entry in its tracking list with connection identifier and transaction ID that matches the values sent in the body of the polling request (Step 454). If the polling request's identifiers match with an original application request that is still on the list, the original application request is being processed by server 104. Subsequently, a success indication will be returned to client 108 as the result (Step 456). However, if no match is found, server 104 returns with an indication of a failure (Step 418). Such failure results in a timeout condition for client 108. Either way, a response message for the polling request is sent to client 108. This polling mechanism can be modified to require a predetermined number of successive polling requests before signaling a failure of the primary RPC request.

Upon receiving the poll response, client 108 will check the resulting code. If it indicates that a failure has occurred, client 108 will immediately terminate its wait sequence for the original request and mark it failed so that appropriate timeout and recovery actions can be taken. Otherwise, the client reiterates, entering into another waiting period by repeating the polling process with another polling request.

Another timeout condition may occur when the polling mechanism exceeds a maximum number of iterations (Step 420). The polling process does not reiterate indefinitely; it is limited by a predetermined number of reiterations. Yet another timeout condition exists when the polling request itself times out (Step 416). Client 108 waits for a predetermine time after sending a polling request. A timeout occurs when client 108 does not receive a polling request response from server 104 after such wait. The timeout conditions indicate to client 108 that a failure has occurred (Step 418); it must initiate recovery action.

When the initial request completes without a timeout or failure condition (Steps 426 and 428), server 104 will send the associated reply message to the client system and removes the entry from its list of active RPC requests (Step 458).

This invention offers several benefits over the baseline timeout mechanism provided by the standard RPC implementation. First, it prevents the client from having to determine "reasonable" fixed timeout values for every possible RPC transaction, which is especially difficult for operations that may vary widely in their processing requirements on the server side. Second, it allows for timely failure detection, even when the operation being requested by client 108 has an extremely long duration. Third, it prevents the occurrence of "false alarms", where an overly aggressive timeout value causes client 108 to give up on a request, even though server 104 is actively processing it. Finally, the invention achieves all of these benefits without requiring modification of the RPC protocol definition itself. All restrictions and regulations for the RPC interactions over a TCP connection are fully obeyed.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and its practical applications to enable others of ordinary skill in the art to understand the invention for various embodiments with various modifications as are suited to the particular use contemplated.

What is claimed is:

1. A method to handle a timeout condition between a client and a server, comprising:
    establishing a first connection between the client and the server;
    sending a request for a transaction from the client to the server using the first connection;
    establishing a second connection between the client and the server;
    sending a poll request from the client to the server using the second connection to determine whether the timeout condition exists; and
    receiving, by the client, a poll response from the server indicating whether the timeout condition exists, wherein the step of determining the timeout condition comprises:
    at the server, posting an identification for the transaction to an entry list;
    at the server, matching the poll request identification with the entry list;
    in response to a match, receiving a success code at the client; and
    in response to a non-match, receiving the timeout condition at the client.

2. A method to handle a timeout condition between a client and a server, comprising:
    receiving a request for a transaction;
    posting an identification for a transaction between the client and the server to a tracking list to record that the request is being processed;
    receiving a poll request, the poll request having a second identification; and
    matching the second identification from the poll request to the identification for the transaction on the tracking list for the timeout condition, wherein the identification includes:
    a unique Internet Protocol address for the client;
    a unique Internet Protocol address for the server;
    a Transmission Control Protocol port number associated with a first connection between the client and the server; and
    a unique transaction identification number, and wherein the second identification includes;
    the unique Internet Protocol address for the client;
    the unique Internet Protocol address for the server;
    a Transmission Control Protocol port number associated with a second connection between the client and the server; and
    the unique transaction identification number.

3. The method as recited in claim 2 wherein the unique transaction identification number comprises a 32-bit identification number managed and issued by the client for each occurrence of transactions.

4. A method to handle a timeout condition between a client and a server, comprising:
    establishing an identification for a transaction between the client and the server;
    requesting a transaction to the server, wherein the transaction is terminated in response to the timeout condition;
    at the server, posting the identification for the transaction between the client and a server to a tracking list to record that the request is being processed;
    sending a poll request to the server to determine whether the timeout condition exists, the poll request having a second identification; and
    at the server, matching the second identification from the poll request to the identification for the transaction on the tracking list for the timeout condition, wherein the identification for the transaction includes:
    a unique Internet Protocol address for the client;
    a unique Internet Protocol address for the server;
    a Transmission Control Protocol port number associate with a first connection between the client and the server; and
    a unique transaction identification number, and wherein the second identification includes:
    the unique Internet Protocol, address for the client;
    the unique Internet Protocol address for the server;
    a Transmission Control Protocol port number associated with a second connection between the client and the server; and
    the unique transaction identification number.

5. The method as recited in claim 4 wherein the unique transaction identification number comprises a 32-bit identification number managed and issued by the client for each occurrence of transactions.

6. A method to handle a timeout condition between a client and a server, comprising:
    establishing an identification for a transaction between the client and the server;
    requesting a transaction to the server, wherein the transaction is terminated in response to the timeout condition;
    at the server, posting the identification for the transaction between the client and a server to a tracking list to record that the request is being processed;
    sending a poll request to the server to determine whether the timeout condition exists, the poll request having a second identification; and
    at the server, matching the second identification from the poll request to the identification for the transaction on the tracking list for the timeout condition, wherein the step of determining the timeout condition comprises:
    at the server; posting the identification for the transaction to an entry list;
    at the server, matching the poll request identification with the entry list;
    in response to a match, receiving a success code at the client; and
    in response to a non-match, receiving the timeout condition at the client.

7. A computer program product tangibly embodied in a computer readable medium and executable by a computer to handle a timeout condition between a client and a server, said computer program product comprising:
    first instructions for establishing an identification for a transaction between the client and the server;
    second instructions for requesting a transaction to the server, wherein the transaction is terminated in response to the timeout condition;
    third instructions for, at the server, posting the identification for the transaction between the client and a server to a tracking list to record that the request is being processed;
    fourth instructions for sending a poll request to the server to determine whether the timeout condition exists, the poll request having a second identification; and
    fifth instructions for, at the server, matching the second identification from the poll request to the identification for the transaction on the tracking list for the timeout condition, wherein the identification for the transaction includes:
    a unique Internet Protocol address for the client;
    a unique Internet Protocol address for the server;
    a Transmission Control Protocol port number associated with a first connection between the client and the server; and
    a unique transaction identification number, and wherein the second identification includes:
    the unique Internet Protocol address for the client;
    the unique Internet Protocol address for the server;
    a Transmission Control Protocol port number associated with a second connection between the client and the server; and
    the unique transaction identification number.

8. An apparatus for handling a timeout condition between a client and a server, comprising:
    means for establishing a first connection between the client and the server;
    means for sending a request for a transaction from the client to the server using the first connection;
    means for establishing a second connection between the client and the server;
    means for sending a poll request from the client to the senor using the second connection to determine whether the timeout condition exists; and
    means for receiving, by the client, a poll response from the server indicating whether the timeout condition exists, wherein the means for determining the timeout condition comprises:
    at the server, means for posting the identification for the transaction to an entry list;
    at the server, means for matching the poll request identification with the entry list;
    in response to a match, means for receiving a success code at the client; and
    in response to a non-match, means for receiving the timeout condition at the client.

9. An apparatus for handling a timeout condition between a client and a server, comprising:
    means for receiving a request for a transaction;
    means for posting an identification for a transaction between the client and the server to a tracking list to record that the request is being processed;
    means for receiving a poll request, the poll request having a second identification; and
    means for matching the second identification from the poll request to the identification for the transaction on the tracking list for the timeout condition, wherein the identification includes:
    a unique Internet Protocol address for the client;
    a unique Internet Protocol address for the server;
    a Transmission Control Protocol port number associated with a first connection between the client and the server; and
    unique transaction identification number, and wherein the second identification includes:
    the unique Internet Protocol address for the client;
    the unique Internet Protocol address for the server;
    a Transmission Control Protocol port number associated with a second connection between the client and the server; and
    the unique transaction identification number.

10. The apparatus as recited in claim 9 wherein the transaction unique identification number comprises a 32-bit identification number managed and issued by the client for each occurrence of transaction.

* * * * *